No. 643,846. Patented Feb. 20, 1900.
H. J. MITCHEL.
SHAFT OR THILL COUPLING.
(Application filed Nov. 27, 1899.)
(No Model.)
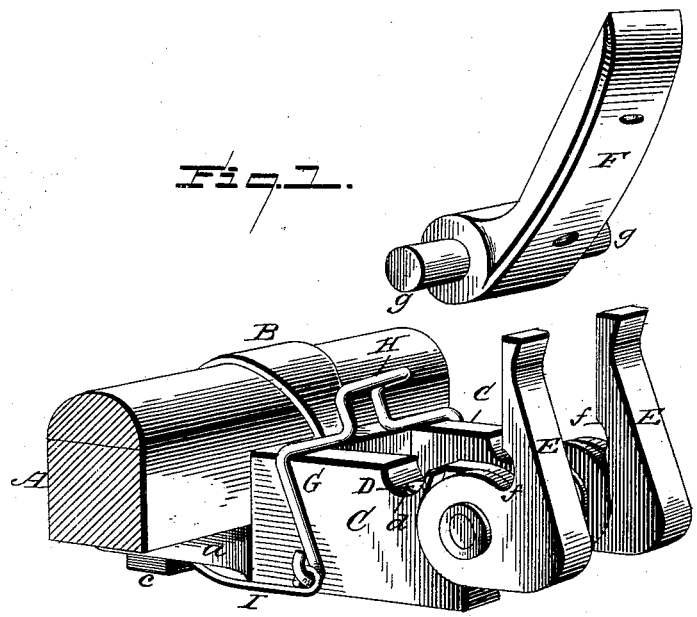
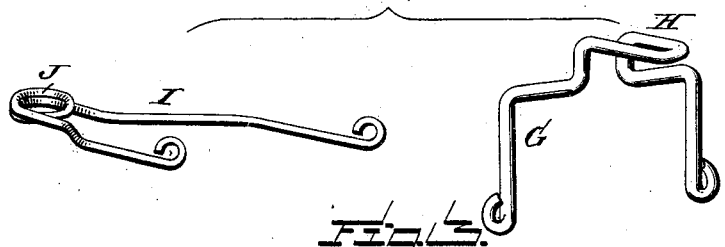
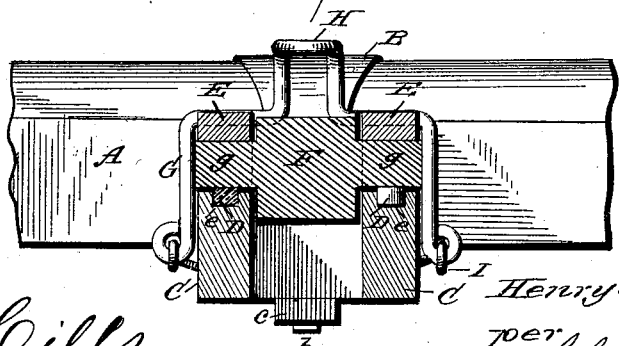
Witnesses
L. C. Hills.
Ray Taylor
Inventor
Henry J. Mitchel.
per Chas. H. Fowler,
Attorney

UNITED STATES PATENT OFFICE.

HENRY J. MITCHEL, OF PLYMOUTH, INDIANA.

SHAFT OR THILL COUPLING.

SPECIFICATION forming part of Letters Patent No. 643,846, dated February 20, 1900.

Application filed November 27, 1899. Serial No. 738,384. (No model.)

*To all whom it may concern:*

Be it known that I, HENRY J. MITCHEL, a citizen of the United States, residing at Plymouth, in the county of Marshall and State of Indiana, have invented certain new and useful Improvements in Shaft or Thill Couplings; and I do hereby declare that the following is a full, clear, and exact description of the same, reference being had to the annexed drawings, making a part of this specification, and to the letters of reference marked thereon.

The present invention has relation to that class of shaft or thill couplings in which are employed pivoted coupling-sections adapted to hold the thill-iron or shaft to the axle-clip and a swinging locking-loop to retain the coupling-sections in place.

It is the purpose of the invention to improve the construction of the above class of couplings, whereby a more perfect coupling of the shaft, thill, or pole is obtained, in addition to providing a simple and effective means to serve as an antirattler, the general construction of the several parts being simple, strong, and durable, as will be hereinafter described and claimed.

Figure 1 of the drawings is a perspective view showing the thill-iron and the axle-clip with its coupling separated from each other; Fig. 2, a detail view of the coupling-loop and spring connection separated from each other; Fig. 3, a sectional view through the coupling and thill-iron.

In the accompanying drawings, A represents the usual axle, and B the clip, of any desirable form and construction for connecting to the axle the coupling-head consisting of the arms C. These arms may be of any suitable form and construction and are cast with a rear extension $a$, with holes therethrough to receive the screw-threaded ends of the bolts $b$ of the clip, with which engage the nuts $c$. Any other suitable and well-known means may be resorted to for attaching the coupling-head to the axle as found most preferable, this being only one of many means that will serve such purpose.

The arms C of the coupling-head have segmental bearings $d$, and in these bearings are mortises $e$ to receive elastic cushions D. The outer sides of the arms C are countersunk, and pivoted thereto are the coupling-sections E. These coupling-sections may be of any suitable form and construction and are cut away, as shown at $f$, which portions come directly over and on line with the segmental bearings $d$ when in use as couplings, as shown in Fig. 3 of the drawings. The pins or journals $g$ of the thill-iron F are seated in the segmental bearings $d$, and the coupling-sections E are brought over and down in position, after which the loop G is brought over the ends of the coupling-sections, which will hold them firmly and securely in place. This loop is preferably constructed of wire and is formed with an outwardly-extending thumb-piece H for operating it in releasing or engaging the loop with the ends of the coupling-sections. The coupling-loop G is connected with the ends of a bifurcated spring I in such manner as will form a joint between the ends of the loop and spring to enable the loop to have a swinging motion. The bifurcated spring I terminates at its rear end in an auxiliary coiled spring J, thereby providing a spring that will have a compound action to hold the coupling-loop down upon the coupling-sections and the coil or auxiliary spring serving to hold the arms of the coupling-loop from spreading laterally. The spring at its coil or rear end is connected to the under side of the rear extension $a$ by one of the bolts $b$ and nut $c$ or by any other desirable means.

The elastic cushions D provide a very simple means to prevent the rattling of the thill-iron and may be renewed as often as desired with comparatively little expense.

Having now fully described my invention, what I claim as new, and desire to secure by Letters Patent, is—

A shaft or thill coupling, consisting of a suitable coupling-head having outwardly-extending arms with segmental bearings and elastic cushions, coupling-sections pivoted to the arms, a swinging loop for engaging the coupling-sections and provided with a thumb-piece, and a bifurcated spring with which the swinging loop engages, said spring having an auxiliary coiled spring, substantially as and for the purpose set forth.

In testimony that I claim the above I have hereunto subscribed my name in the presence of two witnesses.

HENRY J. MITCHEL.

Witnesses:
ADAM E. WISE,
H. H. BONHAM.